Aug. 14, 1928.
D. PARKS
1,680,431
RAND BENDING AND MOLDING MACHINE
Filed Oct. 20, 1926    2 Sheets-Sheet 1
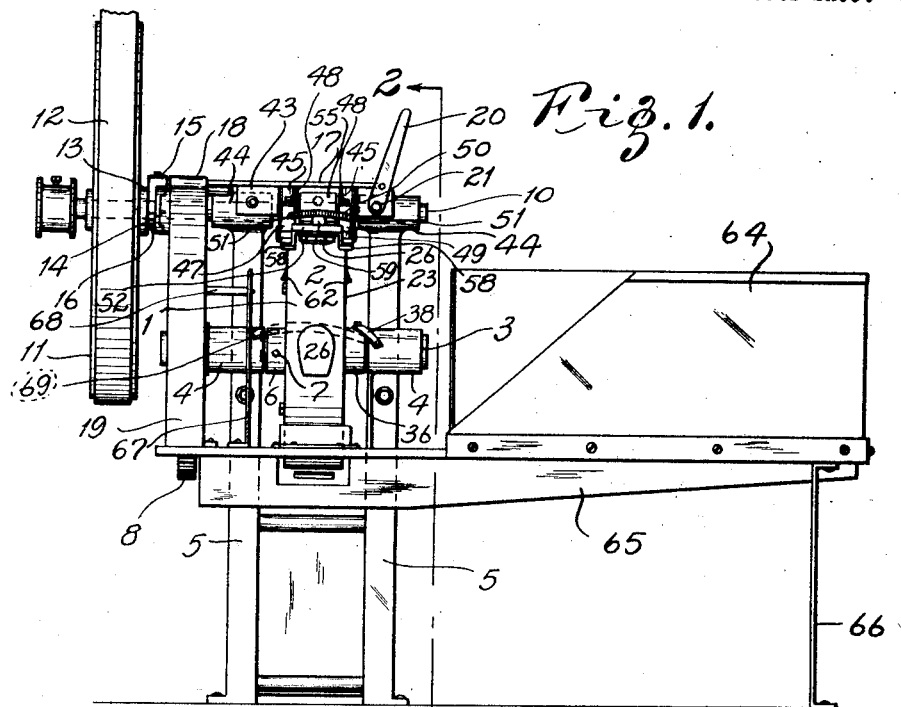
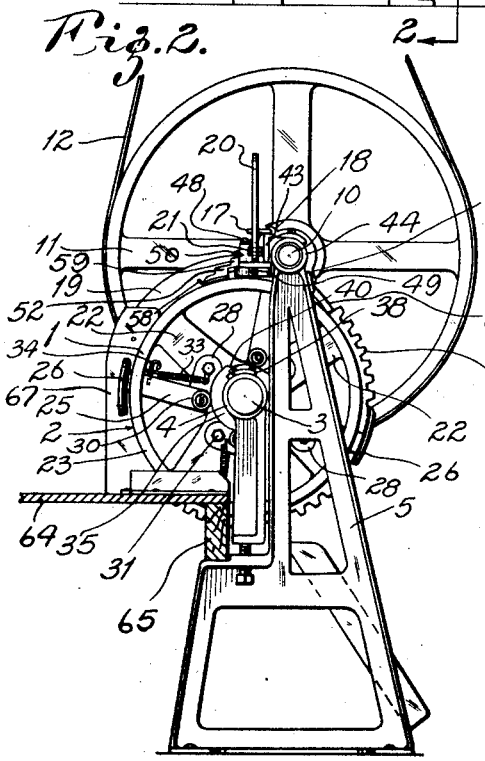
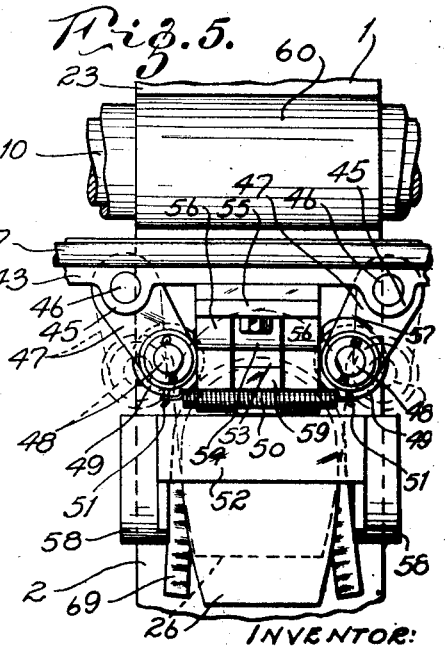
INVENTOR:
DENNIS PARKS.
By Elliott and Harrington
ATTORNEYS Aug. 14, 1928.

D. PARKS 1,680,431

RAND BENDING AND MOLDING MACHINE

Filed Oct. 20, 1926    2 Sheets-Sheet 2

INVENTOR:
DENNIS PARKS.
By Elliott and Harrington
ATTORNEYS

Patented Aug. 14, 1928.

1,680,431

UNITED STATES PATENT OFFICE.

DENNIS PARKS, OF ST. LOUIS, MISSOURI.

RAND BENDING AND MOLDING MACHINE.

Application filed October 20, 1926. Serial No. 142,947.

This invention relates to a machine for shaping and molding rands in a continuous operation.

The general object of the invention is to provide a power-operated machine provided with means for receiving and retaining rands inserted therein by an operator, and which, thereafter, automatically, in a continuous movement of the rands, causes each rand to be bent into the desired shape, compressed, and then discharged from the machine.

With the above general object in view, my improved machine comprises a rotatable power-operated carrier having a series of combined clamping and shaping heads mounted thereon in functional relation to the periphery of the carrier, means for causing said heads to assume various positions relative to the periphery of the carrier in the rotation of the latter, a pair of wipers, preferably in the form of rollers, for causing the end portions of rands inserted between the periphery of the carrier and the underside of said heads to be gradually forced into position under said heads, a stationary roller under which the heads are caused to move in succession and which operates to force said heads against the rand to mold or shape the same, and means for causing each head to be moved outward from the periphery of the carrier after the compressing operation to release the rand and permit of its discharge from the machine.

A detailed object of the invention resides in the provision of an auxiliary shaping device co-operating with the wiping means for guiding the end portions of the rand and insuring their ready entrance into the space between the clamping and shaping heads and the periphery of the carrier.

Another detailed object resides in the provision of guides at the discharge side of the machine for preventing turning movement of the rand after its release by a clamping and shaping head to insure the free discharge of the rand from the machine.

Other objects of the invention relate to various details of construction and to novel combinations and operations of parts as will hereinafter more clearly appear.

A leading characteristic of my invention is its simplicity, the machine comprising a single power-operated rotatable member which is mounted to co-operate with relatively fixed devices, so that rands placed on said member by the operator are caused to pass by said devices and are thereby automatically bent into the desired configuration, held in such bent condition, and thereafter molded or compressed to impart a large degree of permanency to the curved form given to the rand by the bending operation.

The accompanying drawings illustrate a preferred embodiment of the invention, and in said drawings—

Figure 1 is a view in front elevation of the machine;

Figure 2 is a view in sectional side elevation taken on the line 2—2 of Figure 1;

Figure 3 is a view in rear elevation;

Figure 4 is a sectional view on an enlarged scale taken on the line 4—4 of Figure 3;

Figure 5 is a broken plan view on an enlarged scale illustrating more particularly the guiding and wiping means for causing the rand to be progressively bent and forced under the clamping and shaping heads; and Figure 6 is a broken sectional view on the same scale as Figure 4 illustrating another position of one of the clamping heads.

Referring now to the drawings, the numeral 1 (Figs. 1, 3 and 4) indicates a carrier which is in the form of a wheel having a smooth peripheral surface 2, said wheel being fixedly secured on a shaft 3 substantially centrally thereof, which shaft is mounted in bearings 4 supported in uprights 5 (Figs. 2 and 3) which constitute the side members of the main frame of the machine. The wheel or carrier 1 is provided on one side with a hub 6 and is secured on the shaft 3 by means of a set screw 7 passing through said hub. The carrier 1 is rotated by means of a gear 8 secured on one end of the shaft 3 (Figs. 2 and 3), which gear is, in turn, rotated from a pinion 9 mounted on a shaft 10 located at the extreme upper end of the machine. Slidably mounted on one end of this shaft is a pulley 11 driven by a belt 12, the inner side of the pulley being provided with a clutch member 13 adapted to engage with a corresponding clutch member 14 secured on the shaft 10. The clutch member 13 is adapted to be moved into and out of engagement with the clutch member 14 in the usual way by means of a yoke member 15 which engages in a peripheral groove 16 in the clutch member 13, said yoke member being secured on the outer end of a rod 17 which is guided by a bearing 18 mounted on the upper end of a guard 19 enclosing, in part, the gear 8. The inner end of the rod 17 is secured intermediate the ends of a lever 20 pivotally mounted at 21 on the upper part of the frame of the machine, so that by moving said lever in one direction or the other, the clutch member 13 will be moved inward to bring it in engagement with the clutch member 14 on the shaft 10 when the carrier is to be rotated, or to move the clutch member 13 out of engagement with the clutch member 14 when rotation of the carrier 1 is to be stopped. The carrier 1 is the main operated element of the machine and has mounted thereon a plurality of combined holding, clamping and molding members which are designed in operation to be moved past mechanisms for bending the rand into shape under said devices and under a fixed roller which causes the clamping members to compress the rands held thereby. This arrangement will now be described, referring more particularly to Figures 4 and 6.

The carrier 1 comprises spokes 22 radiating from the hub 6 previously referred to, and a rim 23 which is slightly wider than the width of the rand when formed into shape and relatively thick to provide a substantial structure capable of resisting the strain of compression. The rim 23 is apertured at a plurality of points, preferably four as shown and indicated at 24, and through these apertures extend radially disposed arms 25 having secured on their outer ends heads 26. The arms 25 work loosely in the apertures 24, and each of said arms is provided at its bottom with a recess 27. The spokes 22, in the case shown, are disposed intermediate the apertures 24, and pivotally mounted at its inner end on each of these spokes is a short lever 28, the outer end of which carries a stub shaft 29 having mounted on its outer end at a slight distance from the side of the lever 28, a roller 30. The recess 27 in the bottom of each arm 25 is adapted to engage over the stub shaft 29 of each of the levers 28 in the space between the side of said lever and the inner side of the roller 30. Each of the levers 28 is pivoted on a spoke 22 by means of an adjusting screw 31 on which it is adapted to rock. Each of these adjusting screws has projecting from its head a short arm 32, to the outer end of which is connected one end of a coil spring 33, the upper end of which is caught over the pin 34 which is preferably removably inserted in a hole provided in one edge of the corresponding arm 25. By removing this pin the arm 25 and its head can be readily removed from the carrier for the purpose of repair, cleaning, or the like. As the carrier 1 is rotated, the arms 25 are adapted to be operated to cause the heads 26 to assume, in succession, a holding position for a rand inserted at its forward end in the space between it and the periphery of the carrier; a clamping position for offering the proper resistance to the entrance of the rand beneath it, so as to prevent buckling of the rand and provide a limit to the inward movement thereof while, at the same time, clamping the rand in place; a molding position in which the rand is compressed to impart more or less of a permanent curved shape thereto; and, finally, a discharge position in which the rand is permitted to fall off of the carrier. These operations are effected through the medium of a fixed cam over which the rollers 30 of the arms 25 roll. This cam is indicated in Figures 4 and 6 by the numeral 35 and is provided with a hub 36 loosely mounted on the shaft 3, Babbitt metal 37 being preferably interposed between the hub 36 and the surface of the shaft 3. The hub 36 is prevented from turning by means of a fastening strap 38 (Fig. 1), one end of which is bolted to a bearing 4 and the other end to the hub 36. The springs 33 normally pull the arms 25 inward, while the levers 28 and rollers 30 are free to move independently of the arms 25 except when a portion of the cam 35 forces the stub shaft into engagement with the bottom of the recess 27 of one of said arms. The cam 35 has its periphery of such configuration as to cause the heads 26 to successively assume the positions indicated in the rotation of the carrier 1. What may be termed the normal cam surface of the cam is indicated at 39, and as each roller 30 moves over this surface, its stub shaft 29 will be moved outward to engage the bottom of the recess 27 of the corresponding arm 25 and cause the head to assume the holding position, or that shown at the bottom and extreme left of Figure 4. In this position of the head 26, the rand, with its beveled or thin edge pointing downwardly, may be inserted under the head 26. At the termination of the cam surface 39, in the clockwise direction, the cam 35 has a deepened cam surface indicated at 40, and as the roller 30 passes off of the cam surface 39, its lever 28 falls by gravity carrying the stub shaft 29 out of contact with the bottom of the recess 27 and permitting the spring 33 of such arm to draw the head 26 inward to decrease the distance between the undersurface of the head and the periphery of the carrier 1. This position is shown in Figure 6. In such position, the head is adapted to offer a sufficient resistance to the movement of the thin crimped edge of the rand beneath it and into the space between the bottom surface of the head and the surface of the carrier as to straighten out said crimped edge and also cause it to assume, progressively, a curved position. If this resistance were not offered to the entrance of the rand, the bending of the rand would not be uniform and buckling of the thin edge of the rand would not so readily be avoided. Beyond the cam surface 40, the cam 35 is provided with a still deeper and substantially flat portion 41 which permits the roller 30 and its stub shaft 29 to fall still lower so as to enable the head 26 to move to its extreme point of closest approach to the periphery of the carrier. This position is shown, as to one of the heads, at the top of Figure 4. Finally, the cam 35 beyond the surface 41 is provided with an enlargement forming a projecting surface 42 which, as each roller 30 passes onto it, causes its stub shaft 29 to move into engagement with the bottom of the recess 27 of the corresponding arm 25 to move the head 26 of said arm outward a considerable distance from the peripheral surface 2 of the carrier to permit the rand to fall therefrom. I will now describe the devices by means of which the rands are wiped under the heads 26 and thereafter compressed.

Referring to Figures 1, 4 and 5, the numeral 43 indicates a frame plate extending transversely of the machine at its upper end and being secured at its ends on the sides of bearings 44, one of which is provided at the upper end of each of the side uprights 5. These bearings support the shaft 10, previously referred to. Provided on the front side of this plate are bearings 45 in which are rotatably mounted pivot pins 46 projecting upwardly from the upper side of arms 47 located on opposite sides of the central circumferential line of the carrier 1, the pivot pins 46 being spaced apart for a distance substantially equal to the width of said carrier. Rotatably mounted on a stub shaft 48 projecting upwardly from the outer end of each of the arms 47 is a roller 49 which constitute the wipers for forcing the opposite end portions of the rand under the heads 26. To accomplish this operation, the rollers 49 are normally drawn toward each other by means of a coil spring 50 having its opposite ends secured to lugs 51, one of which is located on the outer end of each of the arms 47. As shown by Figure 5 in full lines, the rollers 49 normally lie in the path of the sides of the heads 26 and are adapted to be separated or forced outward, as shown by dotted lines, as the heads 26 pass between them. In order to guide the rand and maintain it in a position to be engaged by the rollers 49 and be wiped under the heads 26 as they pass between said rollers, I provide an auxiliary or preliminary shaping device the function of which is to impart a slight inward bending movement to the end portions of the rand prior to the engagement thereof by the rollers, and also to prevent the free end portions of the rand from bending so far upward, or otherwise occupying such a distorted position relative to the heads 26, as to prevent the ready insertion of its edge beneath each head 26 as it passes between the rollers 49. This auxiliary shaping device comprises a casting 52 which, as shown, has a width slightly in excess of that of the carrier 1, above which it extends transversely. Projecting from the rear side of the casting 52 at its center is an arm 53 which is provided at its inner end with a bearing 54. Secured on the front face of the frame plate 43 is a bracket 55 (Figs. 4 and 5) which provides on its front face at opposite sides bearings 56. The casting 52 is pivotally mounted on the bracket 55 by inserting the bearing 54 between the bearings 56 and then passing a pin 57 through all of said bearings. On its underside, the casting 52 is provided at opposite sides with guide shoes 58 (Fig. 4) which normally rest upon the periphery of the carrier 1 and between which guide shoes the heads 26 are adapted to pass with considerable clearance between the inner sides of the shoes and the outer sides of the heads. In order to maintain the shoes 58 in yielding contact with the periphery of the carrier 1, so that the casting 52 will offer sufficient resistance to the tendency of the rand to raise it, I preferably provide on the upper side of said casting a central lug 59 which is located directly under the spring 50 (Fig. 4) which it normally flexes upwardly from a normal horizontal position, as more clearly shown in Figure 1, so that said spring will always tend to yieldingly hold the casting 52 from upward movement.

For compressing the rand, I provide relatively stationary means under which each head 26 passes in the rotation of the carrier, and which operates to force the head inward to compress the rand beneath it. This compressing means is preferably in the form of a roller 60 (Figs. 3, 4, and 5) which is secured on the shaft 10, previously referred to, intermediate the bearings 44 for said shaft. After a head 26 has passed under the roller 60 to compress the rand beneath it, its roller 30 passes onto the projecting portion 42 of cam 35 to move the head outward or away from the periphery of the carrier 1 and release the rand so as to permit it to fall out of the machine, as shown by dotted lines in Figure 3.

It frequently happens that when the rand is released in this manner, instead of falling directly downward in the manner shown by Figure 3, one of its ends will fall away before the other causing the rand to turn and lodge under the head and thus prevent it falling away. To obviate this, I provide on the rear side of the machine outwardly curved guide plates 62 (Figs. 3 and 4) which are secured to a cross bar 63 secured at its opposite ends to the upper ends of the frame uprights 5. By an inspection of Figure 3, it will be seen that as the rand, shown by dotted lines, is carried between the guide plates 62, its free ends will be prevented from springing outward and they will be held against such movement until the head 26 has been moved outward sufficiently to wholly release the rand so that when the head 26 passes beyond the guides, the rand is free to fall directly downward, as illustrated, as to one of said rands, by dotted lines in Figure 3.

To facilitate the operation of placing rands on the carrier, I find it convenient to mount on or adjacent to the machine a box or container 64 for holding the rand blanks, said container being mounted on a supporting beam 65 secured at one end to the uprights 5 at one side thereof, and supported at its outer end by standards 66. The guard 19, previously referred to, is bolted on tne inner end of the beam 65. An upright guide 67 mounted on the top of the beam 65 near its inner end and braced by a cross-bar 68 connecting the guard with said guide assists the operator in positioning the rand centrally under the head (Fig. 1). The operation of the machine is as follows:

The clutch members 13 and 14 being in engagement, the carrier 1 will be continuously rotated. The operator takes a rand 69 from the container 64 and places its beveled edge under the forward edge of a head 26, as shown by dotted lines in Figure 1, the rand extending substantially at right angles to the direction of movement of the carrier, or crosswise thereof, and its ends usually projecting beyond the sides of the carrier. As the next head 26 comes into position, he repeats the operation, and so on with each succeeding head. The rand placed under the head 26 is carried under the auxiliary guide or shaping member 52, its free ends being engaged by the inner sides of the shoes 58 and bent inward or toward the head (Fig. 5), while the top of the guide or casting 52 prevents the free end portions of the rand from rising to any considerable extent above the plane of the head 26. At about this point, the roller 30 associated with this particular head passes into the deepened portion 40 of the cam 35, permitting the spring 33 to draw the head 26 downward into somewhat firm engagement with the rand. This head next passes between the rollers 49, which engage the outer edge of the rand on either side of the head, and as the latter passes between the rollers, operate to force the rand under the head against the resistance offered by the pull of the spring 33. This resistance insures the rand being bent uniformly, and also tends to prevent any buckling of the thin inner edge of the rand forced under the head. The power of the spring 50 normally tending to pull the rollers 49 into engagement with opposite sides of the heads 26 is sufficient to force the rand under the head, and also to cause the rollers 49 to follow the configuration of the sides of the head from its largest to its smallest lateral dimension as the head passes between the rollers. These rollers are, of course, moved outwardly, as shown by dotted lines in Figure 5, to permit the head 26 to pass between them. Immediately after this operation, the roller 30 passes onto the still deeper or substantially flat portion 41 of the cam, and as the head 26 passes under the staionary roller 60, the head will be forced under considerable pressure against the rand located in the space between its underside and the periphery of the carrier 1, so that the rand will be highly compressed and a high degree of permanency given to the curved or horse-shoe shape imparted to it by the bending operation, previously described. After passing under the roller 60, the head passes between the guides 62, which prevent the free ends of the rand, or one of them, from springing out prematurely from beneath the head, and at about this time, the roller 30 passes onto the projecting portions 42 of the cam 35, moving the stub shaft 29 outward into engagement with the bottom of the recess 27 of the arm 25 and forcing the head 26 radially outward so that it will release the rand, and as the head passes beyond the guide 62, the rand will fall from under the head and out of the machine, as shown by dotted lines in Figure 3.

To facilitate the passage of the heads 26 under the roller 60, the latter is caused to rotate with the shaft 10 at the same peripheral speed that is imparted to the outer face of the heads 26 by the carrier 1. This, of course, prevents a differential in the movement of the roller and head which would necessarily result in a grinding action.

From the foregoing description, it will readily be seen that the machine is exceedingly simple and easy to operate, being entirely automatic in its action, the only function that the operator has to perform being to place the rand under the forward end of each head 26 as it rises into the proper position in the rotation of the carrier, or to substantially that position shown, as to the head 26, in Figure 1. The carrier 1 is the only movable operating part, and by carrying the rand past the shaping and compressing members, which are relatively stationary, the operation of bending and compressing the rand is performed and, by the co-action of the cam 35, which is also stationary, the rand is permitted to be discharged from the machine. There are, therefore, no parts to adjust; in a practical sense, there is no mechanism to get out of order; and there is no element of danger to the operator in feeding the machine with the rands, which operation consists merely in inserting the central part of the rand under the forward end of the head.

I claim:

1. A machine of the class described comprising a rotatable carrier, means mounted thereon for receiving a rand strip placed crosswise thereof, and means located in the path of the rand strip as it is advanced by said carrier for engaging the end portions of the rand strip and bending them toward each other.

2. A machine of the class described comprising a rotatable carrier, means mounted thereon for receiving a rand strip placed crosswise thereof, and relatively stationary means located in the path of the rand strip as it is advanced by said carrier for engaging the end portions of said strip and bending them toward each other.

3. A machine of the class described, comprising a rotatable carrier having means mounted thereon for receiving a rand strip, and a pair of yieldingly mounted members one of which is located at either side of the path of movement of said rand receiving member and adapted to be engaged by the outer end portions of the rand strip as it is advanced by the carrier and to bend said end portions toward each other.

4. A machine of the class described comprising a rotatable carrier having means mounted thereon for receiving a rand strip, and a pair of rollers yieldingly forced toward each other and one of which is located at each side of the path of movement of said rand receiving member for engaging and forcing the end portions of the rand strip toward each other as said strip is advanced in the movement of the carrier.

5. A machine of the class described comprising a rotatable carrier having means mounted thereon for receiving a rand strip, a pair of rollers located, respectively, on opposite sides of said rand receiving member and adapted to be engaged by the end portions of the rand strip as it is advanced by the carrier and to bend said end portions toward each other, and a coil spring connecting said rollers and tending normally to draw them toward each other.

6. A machine of the class described comprising a rotatable carrier having mounted thereon means for receiving a rand strip, an auxiliary shaping member positioned over said carrier at a distance therefrom and having top and side engaging members and under which the rand receiving member passes in the rotation of the carrier, and a pair of yieldingly mounted wiping members located, respectively, in the path of movement of the sides of said rand receiving member beyond said auxiliary shaping member and adapted to be engaged by the end portions of said rand strip as it is advanced by the carrier and to bend said end portions toward each other.

7. A machine of the class described comprising a rotatable carrier having means mounted thereon for receiving a rand strip, an auxiliary shaping member pivotally mounted above said carrier and having top and side engaging members, the latter resting on the carrier at opposite sides thereof and spaced apart to permit the rand receiving member to pass between them, yieldingly mounted wiping means located in the path of movement of each side of said rand receiving means beyond said auxiliary shaping device, and adapted to engage the end portions of said strip and bend them toward each other as the strip is advanced by the carrier, and yieldable means for resisting upward movement of said auxiliary shaping member.

8. A machine of the class described comprising a rotatable carrier having means mounted thereon for receiving a rand strip, an auxiliary shaping device pivotally mounted above the carrier and having spaced depending rand engaging members resting on the carrier at opposite sides thereof and between which said rand receiving member is adapted to pass in the rotation of the carrier, a pair of wipers located in advance of said auxiliary shaping device and between which the rand receiving member is adapted to pass to cause the outer ends of the strip to engage said wipers and be forced toward each other as the strip is advanced by the carrier, and unitary means operating to draw said wipers toward each other and to resist upward movement of said auxiliary shaping device.

9. A machine of the class described comprising a rotatable carrier having means mounted thereon for receiving a rand strip, rand bending means located, respectively, at opposite sides of the path of movement of said rand receiving means and between which the latter passes in the rotation of the carrier to cause the outer end portions of said strip to engage the rand bending means and to be bent toward each other, rand compressing means located in advance of said rand bending means and into functional relation with which the rand receiving member is passed in the rotation of the carrier, and means for causing the release of the compressed rand by said rand receiving member as the latter passes beyond said rand compressing means.

10. A machine of the class described comprising a rotatable carrier having means mounted thereon for receiving a rand strip, a pair of wipers located, respectively, at opposite sides of the path of movement of said rand receiving means and between which the latter passes in the rotation of the carrier to cause the outer end portions of said strip to engage said wipers and to be bent toward each other, rand compressing means located beyond said wipers and in functional relation with which the rand receiving member is passed in the rotation of the carrier, means for causing the release of the compressed rand by said rand receiving member as the latter passes beyond said rand compressing means, and guides positioned at opposite sides of the path of movement of said rand receiving means beyond said compressing means to prevent turning of the rand as it is released by said rand receiving member.

11. A machine of the class described comprising a rotatable carrier, a series of rand receiving members mounted thereon and movable toward and from the periphery thereof, means operating in the rotation of said carrier for producing holding, clamping, compressing, and discharge positions, successively, of said rand receiving members, each of said rand receiving members being adapted to retain a rand strip placed under the same in the first named position and to permit the discharge of the rand therefrom in the last named position, and means for successively bending the rand strip and thereafter compressing it in the clamping and compressing positions, respectively, of each rand receiving member.

12. A machine of the class described comprising a rotatable carrier having a series of radially movable members mounted thereon having heads movable toward and from the periphery of the carrier and each of which is adapted to have a rand strip placed thereunder, rand bending means past which each of said heads moves in the rotation of the carrier to cause the outer end portions of said strips to be forced under said heads, compressing means located beyond said rand bending means and into functional relation with which each of said heads, in turn, passes in the rotation of the carrier, a spring for each of said rand receiving members tending normally to draw the head thereof toward the periphery of said carrier, and a cam co-operating with said rand receiving members and functioning to maintain each head in a position to hold the rand inserted beneath it, then to permit the head to move to clamping position under the influence of its spring prior to the passage of the head past the bending means, then to permit further inward movement of the head under the action of said compressing means, and then to move said head a maximum distance beyond the periphery of the carrier to permit the discharge of the rand.

13. A machine of the class described comprising a rotatable carrier, a series of arms mounted for radial movement in apertures provided at separated points in the rim of said carrier, a head on the outer end of each of said arms adapted to co-operate with the periphery of the carrier to hold a rand strip placed beneath its forward end, a pair of yieldingly mounted rollers between which each of said heads is adapted to pass to bring the outer end portions of said rand strip into engagement with said rollers and cause said end portions to be wiped under said head, a relatively fixed roller located beyond said wiping rollers under which each of said heads is adapted to pass and be forced thereby toward the periphery of the carrier to compress the rand, a fixed member having a plurality of cam surfaces over which the inner ends of said arms move in functional relation, and a spring tending to move each of said arms toward said cam, said cam surfaces being arranged to cause each head, in turn, to assume a holding position for a rand strip inserted beneath it, to move closer to the periphery of the carrier to offer resistance to the entrance of the rand beneath the head as it passes the wiping rollers, then to be forced by the compressing roller further toward the periphery to compress the rand, and, finally, to be moved outward a maximum distance beyond the periphery of the carrier to permit the discharge of the rand.

14. A machine of the class described comprising a rotatable carrier, a series of arms mounted for radial movement in apertures provided at separated points in the rim of said carrier, a head on the outer end of each of said arms adapted to co-operate with the periphery of the carrier to hold a rand placed beneath its forward end, a series of levers each of which is pivotally mounted on the carrier at one end, a stub shaft provided with a roller mounted at the inner end of each lever, each of said arms having a recess in its lower end loosely engaging one of said stub shafts, a spring for each arm tending normally to force the bottom of its recess into engagement with the stub shaft of the corresponding lever, and a fixed member having a plurality of cam surfaces over which said rollers are adapted to pass, said cam surfaces being arranged to cause each head, in turn, to assume a holding position for a rand strip inserted beneath it, to move closer to the periphery of the carrier to offer resistance to the entrance of the rand beneath the head as it passes the wiping rollers, then to be forced by the compressing roller further toward the periphery to compress the rand, and, finally, to be moved outward a maximum distance beyond the periphery of the carrier to permit the discharge of the rand.

15. A machine of the class described comprising a rotatable carrier, means mounted thereon for receiving a rand strip placed crosswise thereof, and means located in the path of the rand strip as it is advanced by said carrier for engaging the end portions of the rand strip and bending them under said receiving means.

16. A machine of the class described comprising a rotatable carrier having yieldable means mounted thereon for receiving a rand strip placed crosswise thereof, rand bending means located, respectively, at opposite sides of the path of movement of said rand receiving means and between which the latter passes in the rotation of the carrier to cause the outer end portions of said strip to engage the rand bending means and to be bent under said receiving means, and rand compressing means located in advance of said rand bending means and into functional relation with which the rand receiving member is passed in the rotation of the carrier.

17. A machine of the class described comprising a rotatable carrier having yieldable means mounted thereon for receiving a rand strip, rand bending means located, respectively at opposite sides of the path of movement of said rand receiving means and between which the latter passes in the rotation of the carrier to cause the outer end portions of said strip to engage the rand bending means and to be bent under said receiving means, a relatively stationary means located in advance of said rand bending means and under and into engagement with which the rand receiving member is passed in the rotation of the carrier to force said receiving means into engagement with the rand to compress the same.

18. A machine of the class described comprising a rotatable carrier, yieldable means mounted thereon for receiving a rand strip placed crosswise thereof, means located in the path of the rand strip as it is advanced by said carrier for engaging the end portions of the rand strip and bending them under said receiving means, and a relatively stationary roller located in advance of said rand bending means and under which the rand receiving member is passed in the rotation of the carrier to cause said receiving member to be forced into engagement with the rand.

In testimony whereof, I have hereunto set my hand.

DENNIS PARKS.